United States Patent
Burdick et al.

(10) Patent No.: US 7,020,804 B2
(45) Date of Patent: Mar. 28, 2006

(54) TEST DATA GENERATION SYSTEM FOR EVALUATING DATA CLEANSING APPLICATIONS

(75) Inventors: Douglas R. Burdick, Ithaca, NY (US); Robert J. Szczerba, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 537 days.

(21) Appl. No.: 10/308,764

(22) Filed: Dec. 3, 2002

(65) Prior Publication Data

US 2004/0107386 A1    Jun. 3, 2004

(51) Int. Cl.
*G06F 11/00* (2006.01)

(52) U.S. Cl. .......................... 714/41; 714/37
(58) Field of Classification Search .............. 714/37, 714/41, 49
See application file for complete search history.

(56) References Cited

U.S. PATENT DOCUMENTS

| | | | |
|---|---|---|---|
| 5,606,690 A * | 2/1997 | Hunter et al. | 707/5 |
| 6,006,028 A | 12/1999 | Aharon et al. | |
| 6,035,295 A * | 3/2000 | Klein | 707/6 |
| 6,195,658 B1 | 2/2001 | Comito et al. | |
| 6,219,802 B1 | 4/2001 | Becker et al. | |
| 6,275,954 B1 * | 8/2001 | Herman et al. | 714/25 |
| 6,301,701 B1 | 10/2001 | Walker et al. | |
| 6,523,041 B1 * | 2/2003 | Morgan et al. | 707/102 |
| 6,539,503 B1 * | 3/2003 | Walker | 714/703 |
| 6,751,756 B1 * | 6/2004 | Hartnett et al. | 714/54 |

OTHER PUBLICATIONS

Elfeky, Verykios, Elmagarmid, A Record Linkage Toolbox, IEEE, Proceedings of the 18th International Conference on Data Engineering, 2002.*

"Real-world Data is Dirty: Data Cleansing and the Merge Purge Problem", Mauricio A. Hernandez; Salvatore J. Stolfo; Department of Computer Science, Columbia University.

* cited by examiner

*Primary Examiner*—Scott Baderman
*Assistant Examiner*—Brian Assessor
(74) *Attorney, Agent, or Firm*—Tarolli, Sundheim, Covell & Tummino L.L.P.

(57) ABSTRACT

A system evaluates a data cleansing application. The system includes a collection of records cleansed by the data cleansing application, a plurality of dirtying functions for operating upon the collection to introduce errors to the collection, and a record of the errors introduced to the cleansed collection. The plurality of dirtying functions produces a collection of dirty records.

9 Claims, 7 Drawing Sheets

| Problem | Dirty Data | Comments | Standardization/ Validation/ Correction can handle? |
|---|---|---|---|
| Missing value | Phone = 999-999999 | Unavailable entries during data entry (dummy values or null) | Maybe |
| Misspellings- Phonetic | Name ="Zerba" (should be 'Szczerba') | Usually results in very different strings. | No |
| Misspellings - Typographical | City="Oowego" City="Owgo" | Can be either insertion, deletion, transposition, or substitution of characters. Strings are still very similar. | Depends, If results in valid value, NO If results in nonsense, Yes |
| Wrong Word Order | partName1 = "Hammer No. 10" partName2 = "No. 10 Hammer" | Switch entire substring values - may be handled by standardization | Probably YES |
| Cryptic values, Unique Abbreviations | Occupation="DB Prog." Experience="B" | Ad-hoc, proprietary standard. Usually not documented anywhere. | NO, if not documented |
| Common Abbreviations | St. for Street, Dr. for Doctor, etc. | These are widely accepted and used by many people. | YES |
| Acronym/Initials | PSU for Penn State Univ. D. B. for Doug Burdick | These are widely accepted acronyms ONLY | Acronyms, YES (if table) Initials, NO |
| Embedded Values | Name="J. Smith 12/2/70 New York" | Multiple values entered in for one attribute (in a free-form field) | YES |
| Misfielded values | City="United States" | No city by that name | YES |
| Violated attribute dependancies | City="Owego" Zip="14850" | City and zip code should correspond | YES |
| Field (Word) Transpositions | Name1 = "J. Smith" Name2 = "Smith J." | Usually happens in free-form | YES -if identifiable |
| Duplicated Records | Emp1=(name="John Smith"...); Emp2=(name="J. Smith"...) | Same employee represented twice due to data entry errors | ABSOLUTELY NOT |
| Contradicting Records | Emp1=(name="John Smith" bdate="12/2/70") Emp2=(name="John Smith" bdate="12/12/70") | Same real-world entity described by two different values | NO |
| Wrong References | emp=(name="Doug Burdick", deptno=L49) | Referenced department (L49) is defined but wrong (should be L48) | NO |

| Cause of Error | Example |
|---|---|
| Looks Like – Handwritten source material is misread and mistyped into system | "John A. Ghose" read as "John H. Chose" – Poorly written "A" looks like "H", "G" like "C", "n" like "m", "8" like "3", "1" like "1", "0" like "O", etc... |
| Sounds Like – Spoken source material is misheard and mistyped into system | "Szczerba" heard as "Serba" or "Zerba" – Spoken "Stein" sounds like "Stine", "s" like "z", "g" like "j", "c" like "k", "ku" like "qu", "ro" like "row" etc... |
| Keyboard Missing Character – Typist leaves out a letter, most likely first or last letter of a name or word, or digit of a number, or first vowel of a pair | "Johnson" is typed as "Ohnson" – "home" as "ome", "Richards" as "Richard", "Street" as "Stret", "1234" as "234", "ei" as "i", etc. |

Fig.10

| Replace | With (and vice-versa) |
|---|---|
| A [Upper Case only] | H [Upper Case only] |
| C [Upper Case only] | G [Upper Case only] |
| 3 | S [Upper Case Only] |
| O [Upper Case only] | 0 [number zero] |
| m [Lower Case only] | n [Lower Case only] |
| l [LC only] | 1 [number one] |

Fig.11

| Replace | With (and vice-versa) |
|---|---|
| G | J |
| S | Z |
| KU | QU |
| RO | ROW |

Fig.12

TEST DATA GENERATION SYSTEM FOR EVALUATING DATA CLEANSING APPLICATIONS

FIELD OF THE INVENTION

The present invention relates to a system for cleansing data, and more particularly, to a system for evaluating data cleansing applications.

BACKGROUND OF THE INVENTION

In today's information age, data is the lifeblood of any company, large or small; federal, commercial, or industrial. Data is gathered from a variety of different sources in various formats, or conventions. Examples of data sources may be: customer mailing lists, call-center records, sales databases, etc. Each record from these data sources contains different pieces of information (in different formats) about the same entities (customers in the example case). Each record from these sources is either stored separately or integrated together to form a single repository (i.e., a data warehouse or a data mart). Storing this data and/or integrating it into a single source, such as a data warehouse, increases opportunities to use the burgeoning number of data-dependent tools and applications in such areas as data mining, decision support systems, enterprise resource planning (ERP), customer relationship management (CRM), etc.

The old adage "garbage in, garbage out" is directly applicable to this environment. The quality of the analysis performed by these tools suffers dramatically if the data analyzed contains redundant values, incorrect values, or inconsistent values. This "dirty" data may be the result of a number of different factors including, but certainly not limited to the following: spelling errors (phonetic and typographical), missing data, formatting problems (incorrect field), inconsistent field values (both sensible and non-sensible), out of range values, synonyms, and/or abbreviations. Because of these errors, multiple database records may inadvertently be created in a single data source relating to the same entity or records may be created which don't seem to relate to any entity. These problems are aggravated when the data from multiple database systems is merged, as in building data warehouses and/or data marts. Properly combining records from different formats becomes an additional issue here. Before the data can be intelligently and efficiently used, the dirty data needs to be put into "good form" by cleansing it and removing these mistakes.

Thus, data cleansing necessarily involves the identifying of similarities between fields in different records. The simplest approach for determining which records have "similar" values for a particular field would be to define only identical values to be "similar". If two records have the same value for the field, they would be considered to have similar values. Otherwise, they would not. This approach is very prone to "noise," or errors present in the output data, causing differences between records describing the same object (i.e., causes records to have different values for the field). Examples of errors occurring during data entry are illustrated in FIG. 1.

A simple way for evaluating a data cleansing method is the introduction of errors to a set of cleansed records producing an artificially "dirty" set of records. The "dirty" set of records may then be cleansed by the data cleansing method. The outputs may then be compared to evaluate the efficiency of the data cleansing method.

The error introduction may comprise the random addition, deletion, or alteration of characters in fields in the set of records. Duplicates of entire existing records may also be added to the cleansed records prior to the introduction of errors.

Conventional methods only produce as output types of errors and frequency of occurrence for a wide range of data types (i.e., last names, street addresses, etc.). These methods also may produce as output breakdowns for error rates based on how the information was entered into the system (i.e., information taken over the telephone, optical character recognizer, used entered form, etc.). However, these outputs are not combined in a single model (i.e., there may exist an error model for a particular type of information such as last names, telephone information, etc., but an error model for last names taken over the telephone would not exist).

SUMMARY OF THE INVENTION

A system in accordance with the present invention generates synthetic test data that closely mimics real cleansed data encountered in practice for a wide variety of information sources and applications. The generated "dirty" data accurately reflects how errors are typically introduced into real data of the type cleansed. Otherwise, the evaluation would not be reliable for estimating performance on other data sets. Synthetically generated data is extremely useful for evaluating how well cleansing applications detect and correct errors, since the location of all errors in the generated data is known. Given this information, the system may straightforwardly measure how many errors the application missed by comparing the application's answer for the test data set against a known correct answer (the cleansed record set).

The assumptions and information used to generate the "dirty" data are visible for examination and verification by the user. The system used to generate the test data incorporates a wide variety of available information about how errors are typically distributed, their frequency, and what types of errors commonly occur. The system is separate from the functions used to introduce the errors to the clean record set. This makes the system flexible enough to generate test data for any type of information used in a variety of applications.

The system utilizes an innovative method for generating synthetic test data for evaluating how well a data-cleansing application detects and corrects errors. The input to the data generator system is a cleansed record set, such that every record refers to a unique real-world entity and is assumed mistake-free. Errors (and possibly duplicate records) are added to this given record set by the system in such a way as to realistically represent how errors are typically introduced in practice. These errors cause records referring to the same real-world object to differ typographically, leading to incorrect and/or redundant information being stored. The idea is to execute a data cleansing application with the dirty test database created by the data generator system for which we know the correct clean solution, and to measure the similarity of the cleansed result to the assumed clean and correct answer. High similarity between these two indicates the application detected and corrected most errors and has a high quality result.

BRIEF DESCRIPTION OF THE DRAWINGS

The foregoing and other advantages and features of the present invention will become readily apparent from the following description as taken in conjunction with the accompanying drawings, wherein:

FIG. 1 is a schematic representation of the performance of a part of an example system in accordance with the present invention;

DETAILED DESCRIPTION OF AN EXAMPLE EMBODIMENT

A system for evaluating a data cleansing application in accordance with the present invention introduces errors into an assumed clean and accurate record collection. The system utilizes the data cleansing application to perform a cleaning operation upon the now "dirty" record collection. The result of this cleaning is compared to the assumed clean and accurate record collection (e.g., the input to the system before the record collection was "dirtied"). Thus, the effectiveness of the data cleansing application may be determined.

An example data cleansing system for use with the present invention (and supporting data structure) identifies groups of records that have "similar" values in different records of the same field. "Similar" means that all of the records in the field set would have the same value if the data were free of errors. The system is preferably robust to "noise" present in real-world data (despite best attempts at standardization, normalization, and correction). The example system may involve the application of sets of transform functions to the fields in each of the records. Additionally, the example system may create a data structure to store the similarity information of the associated records for each field.

Figure 6:
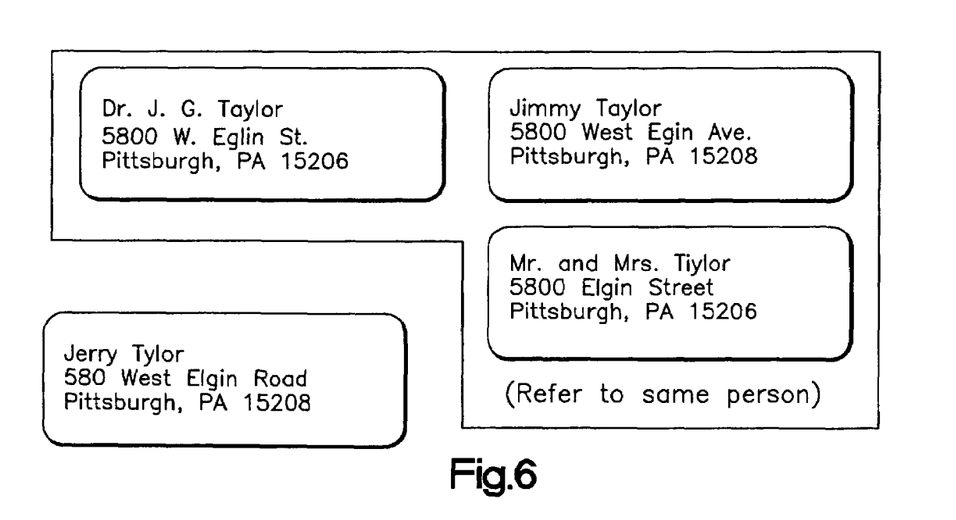
FIG. 6 is a schematic representation of still another example part of a system for use with the present invention.
Figure 7:
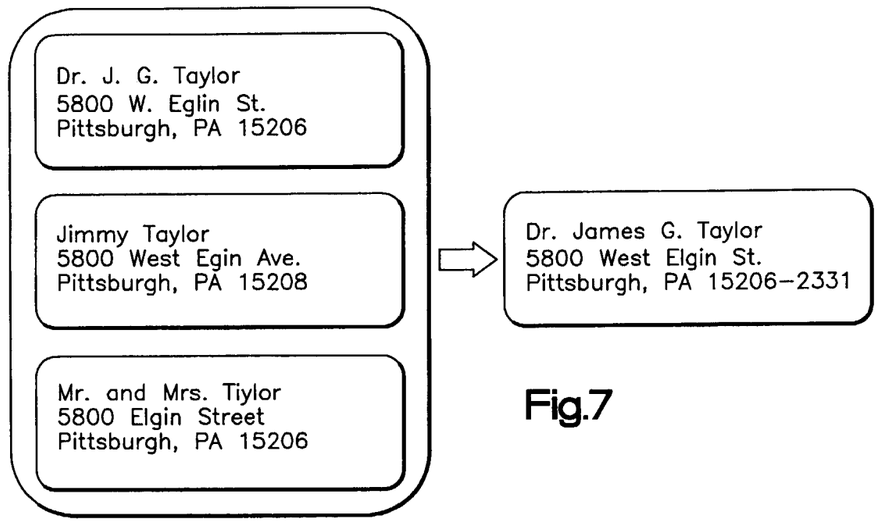
FIG. 7 is a schematic representation of yet another example part of a system for use with the present invention.

Typically, a data cleansing application can be broken down into the following steps: parsing (FIG. 2); validation/correction (FIG. 3); standardization (FIG. 4); clustering (FIG. 5); matching (FIG. 6); and merging (FIG. 7). Note that different approaches may consolidate these steps or add additional ones, but the application is essentially the same.

Figure 2:
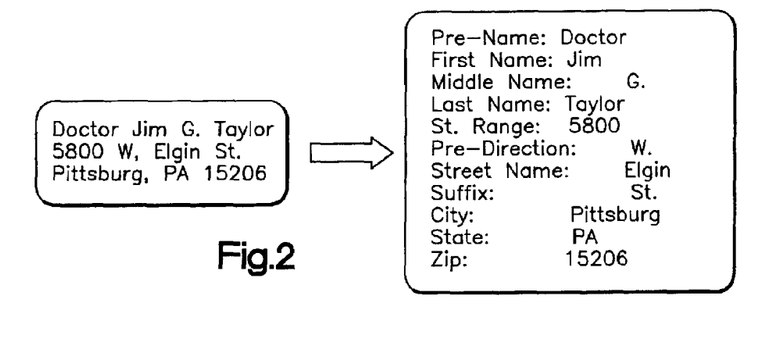
FIG. 2 is a schematic representation of one example part of a system for use with the present invention.

As viewed in FIG. 2, parsing may intelligently break a text string into the correct data fields. Typically, the data is not found in an easily readable format and a significant amount of decoding needs to be done to determine which piece of text corresponds to what particular data field. Note that this step does not involve error correction.

Records may be formatted or free form. Formatted records have field values stored in a fixed order, and properly delineated. Free-form records have field values stored in any order, and it may be unclear where one field ends and another begins.

Figure 3:
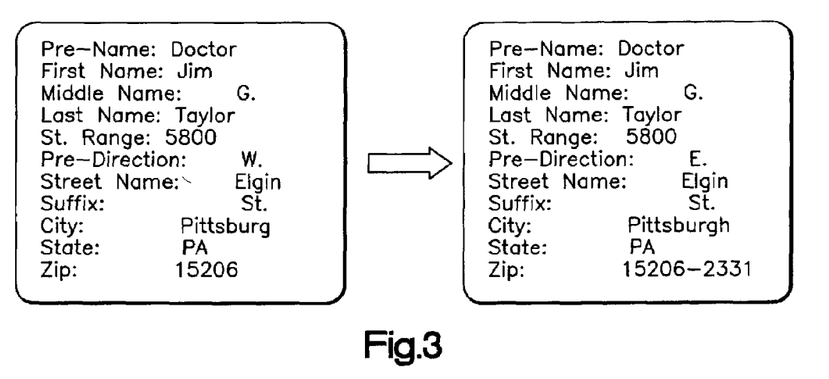
FIG. 3 is a schematic representation of another example part of a system for use with, the present invention.

Once the string is parsed into the appropriate fields, the validation step, as viewed in FIG. 3, checks the field values for proper range and/or validity. Thus, a "truth" criteria must be provided as input to this step for each field.

The correction step may update the existing field value to reflect a specific truth value (i.e., correcting the spelling of "Pittsburgh" in FIG. 3). The correction step may use a recognized source of correct data such as a dictionary or a table of correct known values. For certain data, this step might not be feasible or appropriate and may be skipped.

Figure 4:
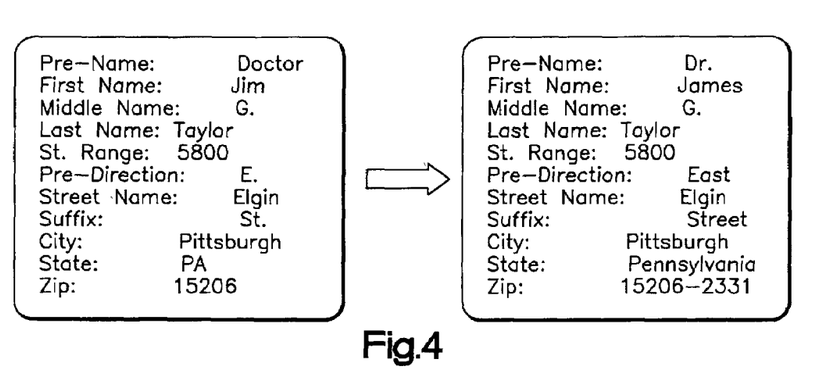
FIG. 4 is a schematic representation of still another example part of a system for use with the present invention.

As viewed in FIG. 4, the standardization step may arrange the data in a consistent manner and/or a preferred format in order for it to be compared against data from other sources. The preferred format for the data must be provided as input to this step.

Figure 5:
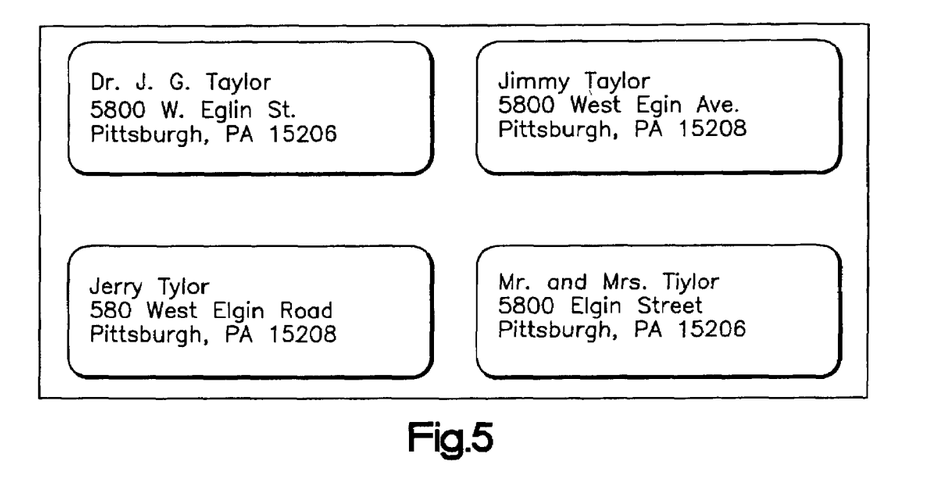
FIG. 5 is a schematic representation of yet another example part of a system for use with the present invention.

As viewed in FIG. 5, the clustering step may create groups of records likely to represent the same entity. Each group of records is termed a cluster. If constructed properly, each cluster contains all records in a database actually corresponding to a unique entity. A cluster may also contain some other records that correspond to other entities, but are similar enough to be considered. Preferably, the number of records in the cluster is very close to the number of records that actually correspond to the entity for which the cluster was built.

As viewed in FIG. 6, the matching step may identify the records in each cluster that actually refer to the same entity. The matching step searches the clusters with an application specific set of rules and utilizes a computational intensive search algorithm to match elements in a cluster to the unique entity. For example, the three indicated records in FIG. 5 likely correspond to the same person or entity, while the fourth record may be considered to have too many differences and likely represents a second person or entity.

As viewed in FIG. 7, the merging step may utilize information generated from the clustering and matching steps to combine multiple records into a unique (and preferably the most correct) view of each entity. The merging step may take data from fields of different records and "fuse" them into one, thereby providing the most accurate information available about the particular entity. The intelligent merging of several records into a single consolidated record ideally creates a new record that could replace the duplicate record cluster it was generated from without loss of any information.

In the clustering and matching steps, algorithms identify and remove duplicate or "garbage" records from the collection of records. Determining if two records are duplicates involves performing a similarity test that quantifies the similarity (i.e., a calculation of a similarity score) of two records. If the similarity score is greater than a certain threshold value, the records are considered duplicates.

Most data cleansing approaches limit the number of these "more intensive" comparisons to only the "most promising" record pairs, or pairs having the highest chance of producing a match. The reasoning is that "more intensive" comparisons of this type are generally very computationally expensive to perform. Many record pairs have no chance of being considered similar if compared (since the records may be very different in every field), thus the expensive comparison step was "wasted" if we simply compare every pair of records. The trade-off for not performing the "more intensive" inspection for every record pair is that some matches may be missed. Record pairs cannot have high enough similarity scores if the similarity score is never calculated.

For an example description, assume the record data is given, including format of the data and type of data expected to be seen in each record field. The format and type information describes the way the record data is conceptually modeled.

Each record contains information about a real-world entity. Each record can be divided into fields, each field describing an attribute of the entity. The format of each record includes information about the number of fields in the record and the order of the fields. The format also defines the type of data in each field (for example, whether the field contains a string, a number, date, etc.).

The clustering step produces a set of records "possibly" describing the same real-world entity. This set ideally includes all records actually describing that entity and records that "appear to" describe the same entity, but on closer examination may not. This step is similar to a human expert identifying similar records with a quick pass through the data (i.e., a quick pass step).

The matching step produces duplicate records, which are defined as records in the database actually describing the same real-world entity. This step is similar to a human expert identifying similar records with a careful pass through the data (i.e., a careful pass step).

The concepts of correctness using the terms "possibly describing" and "actually describing" refer to what a human expert would find if she/he examined the records. The example system for use with the present invention is an improvement in both accuracy and efficiency over a human operator.

If constructed properly, each cluster contains all records in a database actually corresponding to the single real-world entity as well as additional records that would not be considered duplicates, as identified by a human expert. These clusters are further processed to the final duplicate record list during the matching step. The clustering step preferably makes few assumptions about the success of the parsing, verification/correction, and standardization steps, but performs better if these steps have been conducted accurately. In the clustering step, it is initially assumed that each record potentially refers to a distinct real-world entity, so a cluster is built for each record.

The conventional metrics for evaluating such a data cleansing application are typically poorly defined with no consistent standards. Consider the example of a small store sending their mailing list database to a third party vendor to be cleansed. The vendor returns the data and indicates that 33% of the records were duplicates and removed. There is no easy way for the store owner (who may or may not be technically literate) to know if the correct records were removed or if duplicates remain. There is no easy way to determine how good of a job was done without a clear set of performance metrics. Deriving these metrics is difficult or impossible in most cases because there is generally no way to determine what the actual correct answer is without including additional information, which may not be available. For example, the only way to completely verify that a cleansed customer list is correct would be to attempt to contact every customer in the list (i.e., check that each record refers to a different customer and the contact information for him or her is valid). This is infeasible or prohibitively expensive for medium or large customer lists.

The challenge is that there is no reference correct answer for most data cleansing applications. The total number of mistakes and their location in the data are unknown, so we have no clear way of measuring exactly what the application detected. Did the application detect and correct most of the mistakes and redundancies in the data, or actually only a small percentage, or did it find "phantom" mistakes that did not actually exist?

One possible way around this limitation involves using a testing system based on synthetic data from a data generator system. The advantage of using such data is that a clearly defined correct answer is assumed (i.e., the cleansed data set that is the source of the generated data). The input to such a system is a cleansed data set, where each record is assumed to be error-free and refers to a unique real-world entity.

The steps in an example system such as this may be: using a data generator to create a "dirty" test data set from the cleansed data set; inputting the "dirty" test data to the cleansing application being tested; and comparing the resulting output to the original cleansed data set.

In the step of creating the "dirty" test data, some relatively high percentage of replicated records, or copies of records in the cleansed data set, may be added to the cleansed data set. Also, some percentage of the records in this larger record set may be modified by introducing typographical differences and errors. The result will be a "dirty" test data set.

In the inputting step, the "dirty" test data set is given to, and cleansed by, the application. The application outputs the cleansed result, ideally after the application corrects the errors and removes the duplicate records it detected. In the comparing step, if the cleansing application detects and corrects all errors in the "dirty" test data, these two record sets should be identical. The quality of the cleansing application may be judged based on how many replicated records it correctly discovers, associates and merges with their clean original records, and how few unique records it incorrectly merges with other unique records or the incorrectly replicated records.

Figure 8:
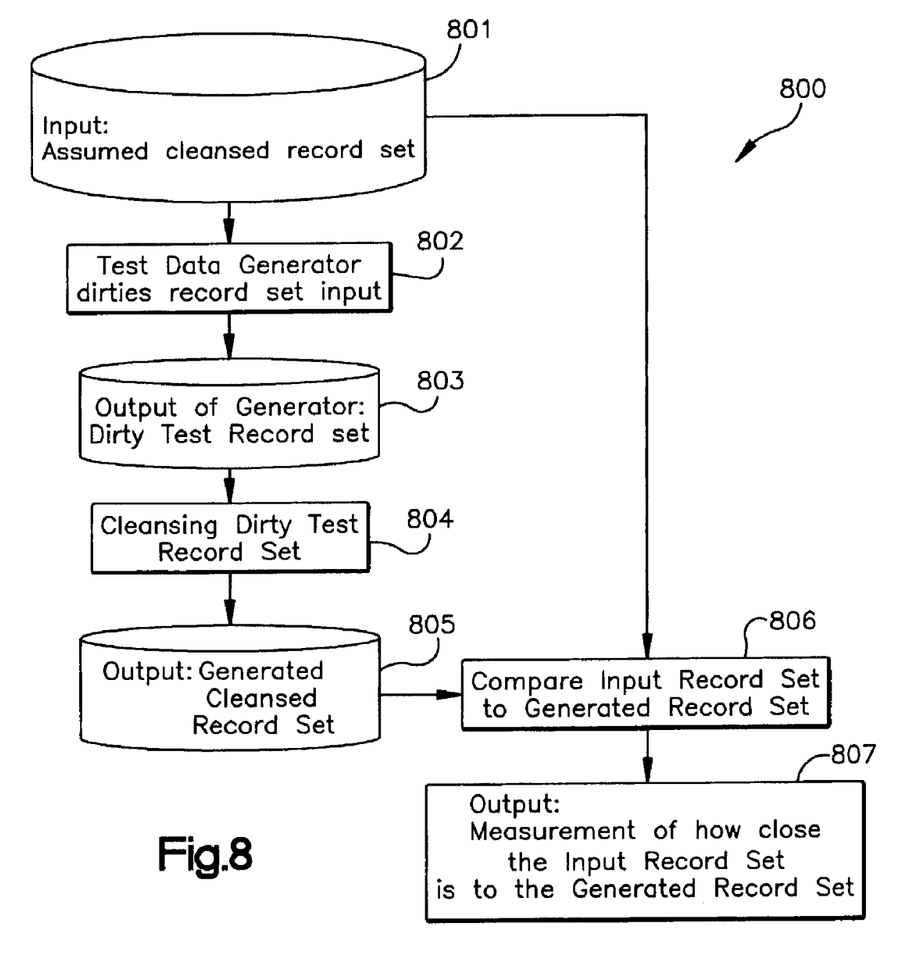
FIG. 8 is a schematic representation of a part of an example system in accordance with the present invention.

As illustrated in FIG. 8, an example system 800 in accordance with the present invention may comprise the following steps: inputting 801 a data set assumed to be clean (i.e., a data set cleansed by the data cleansing application being tested, a known "clean" data set, etc.); dirtying 802 the cleansed data with a test data generator system; outputting 803 the synthetic dirty test data from the test data generator system; cleansing 804 the synthetic test data with the data cleansing application being tested; outputting 805 the artificially generated clean data; comparing 806 the artificial data to the input data set from step 801; and outputting 807 a measurement record of how close the artificial cleansed data (step 805) is to the input data (step 801).

An example data generator system 900 in accordance with the present invention creates synthetic test data (step 802 in FIG. 8). Such a data generator system 900 adds errors to the given cleansed data set (i.e., assumed clean) in a way that closely reproduces how errors are actually introduced into information in practice. Such a system 900 is very robust, since the types (and quantities) of errors that may be introduced vary significantly from application to application.

Figure 9:
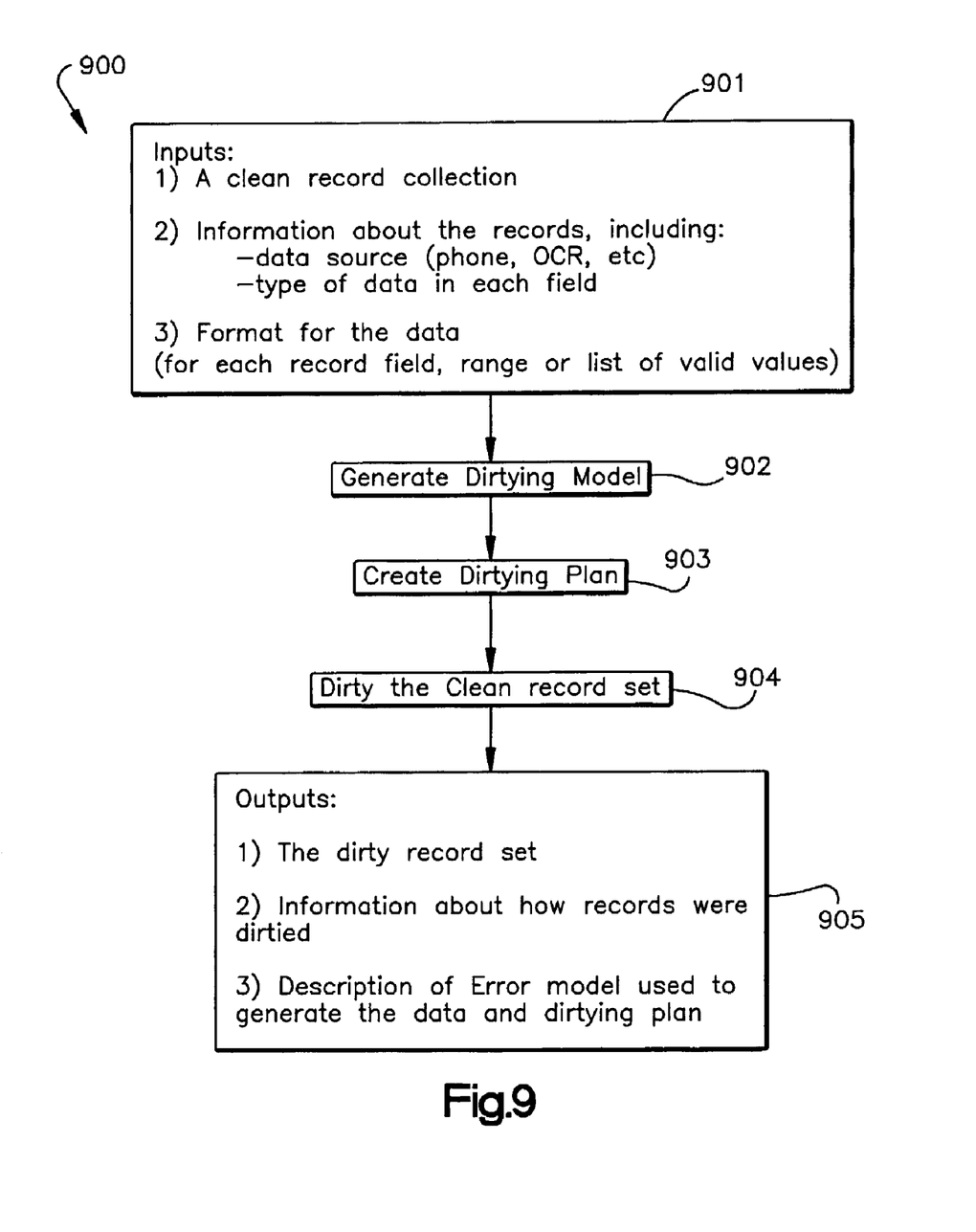
FIG. 9 is a schematic representation of another part of an example system in accordance with the present invention.

A high level illustration of an example "dirty" test data generator system 900 in accordance with the present invention is illustrated in FIG. 9. The input 901 to the "dirty" test data generator system is a sample set of cleansed records, such that ideally all records refer to a unique entity and all records have been validated. Whether the input record set is actually a "clean" set, or has some errors, does not affect the quality of the evaluation, however. The output 905 of the "dirty" test data generator system would be a "dirty" test record set of information regarding how the records were dirtied, and a description of the error model used to generate the "dirty" data and the dirtying plan. At the highest level (FIG. 9), the "dirty" test data generator system 900 may perform the following steps: in step 902, generate a dirtying model; following step 902, in step 903, generate a dirtying plan; and following step 903, in step 904, dirty the input cleansed data from step 901.

The dirtying model is the set of assumptions about how errors are introduced into a real-world record set. Ideally, synthetic data generated following these assumptions will be highly similar to real data for the desired application. The model includes information about appropriate types of errors and their distribution in a record set (i.e., how frequently they occur, which fields they occur in, how frequently they occur together, etc.).

The dirtying plan may translate the abstractions of the dirtying model to a specific set of steps for how errors should be added to the given clean record set. Errors are added to the database as prescribed by the dirtying plan in order to dirty the input (i.e., the cleansed database).

The set of assumptions comprising the dirtying model is used by the data generator system 900 to create the "dirty" database. The assumptions describe factors influencing how errors occur in actual data. If errors were added to a cleansed data set following these assumptions, the resulting synthetic test data ideally closely mimics real data. Most of the assumptions in the model may be based on information about the type of records being mimicked (which may be given along with the cleansed set as input in step 901). This information may include: sources of information from which records were created (e.g., keyboarded, scanned in, taken over phone, etc.); type of value expected to be in each record field (e.g., numerical, alphabetical, etc.); and type of information in the record (e.g., addresses, names, part serial numbers, etc.).

Given this information about the type of data to be mimicked, the data generator system 900 makes assumptions regarding appropriate types of errors, the format of errors, and/or frequency and distribution of errors. While there are many different types of errors given (some shown in FIG. 1), only a limited number may be appropriate for the type of information being generated, based on a particular application.

Figure 10:
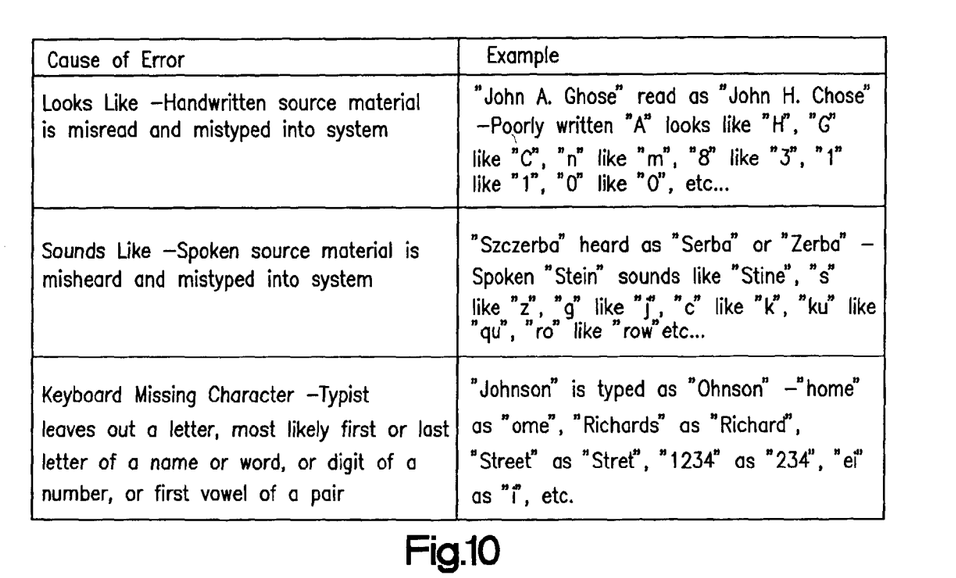
FIG. 10 is a schematic representation of part of example data for use with an example system in accordance with the present invention.

Additionally, certain errors make sense only for a particular record field and not for other fields. Depending on the information source, mistakes in records may have different causes, which make the resulting errors appear different. For example, for misspellings, if the source of information was spoken over the phone, then a likely mistake would be the information was heard wrong (e.g., the name "Szczerba" was heard as "Zerba"). If the information were scanned and optical character recognition was used, then a character may be replaced with a similar shaped character (e.g., the capital "S" in Szczerba may be replaced with the number "5"). FIG. 10 illustrates how different sources for an example misspelling error may cause it to take different forms.

Frequency and distribution include information about how often each of the different types of errors typically occur in the type of data being simulated, how they are distributed among the different fields, and how often multiple errors occur in the same record.

For example, consider customer address data. A simple example of assumptions about error frequency for customer data could be the following: 10% of records have a misspelling in the last name, 15% have the wrong zip code, and 5% of records have both a misspelling in the last name and the wrong zip code.

The list above is only meant to be informative and not exhaustive. By following the assumptions stated in the dirtying model, a dirty data generating system 900 in accordance with the present invention creates a realistic "dirty" data sample that closely replicates how errors actually appear in the type of data the user is attempting to model. Alternatively, the system may generate data for testing specific behavior of the cleansing application (i.e., how well the application handles data with a high proportion of errors, how well it handles a specific type of error, etc.).

The information used to generate the assumptions in the dirtying model may come from many different sources. It could be entered by a user. A learning system could be used derive this information through examining the output of a cleansing application (i.e., from listing of errors found, determine the frequency and distribution of the different error types). Existing documentation for well-known situations could be used (e.g., how frequently optical character recognition recognizes the wrong character).

The system 900 adds errors to a record with dirtying functions for typographically altering a record field in a prescribed way. Based on the assumptions in the dirtying model about appropriate types of errors and frequency/distribution, the system 900 may determine the list of dirtying functions that make sense for each of the record fields and how often they should be utilized.

This determination produces the dirtying plan. The dirtying plan may be reviewed by a user in order to verify that the assumptions of the dirtying model are being followed. The test data generator system 900 generates a dirty test case by adding errors to the cleansed record set, as prescribed in the dirtying model. There are numerous possible implementations for this process. One example implementation includes the following: duplicate several records one (or more) times from the cleansed set; for each of these new duplicates, add errors ("dirtiness") to one or more fields of these new records by calling one of the appropriate dirtying functions thereby following the dirtying plan; add errors to some of the original cleansed records by calling one of the dirtying functions thereby following the dirtying plan; record information for errors added in the prior steps (e.g., error type, which record error added to) and assumptions in the dirtying model used by the data generator system 900; and add new duplicate records to the original cleansed record set.

The recording step above may add the following annotation information: whether the record is unique or part of a duplicate record set (if the record is part of a duplicate set, then a listing of identifiers for the other records in the set); and whether the record contains errors (if it does, which field(s) contain an error and what type of error it is). The annotation provides information about the location and type of errors in the generated data. This information allows the measurement of how many errors the application missed.

Each difference between the application's result and the original input data set represents an error that the application missed or handled incorrectly. Using the annotation data, the system 900 may determine the type of error. The system may also determine if the application correctly associated duplicate records with each other and/or properly removed them.

In practice, there are numerous sources for the dirtiness causing records referring to the same real-world entity to differ syntactically. Different error sources cause even the same error to take different forms (e.g., misspellings, as illustrated in FIG. 10). The dirtying functions simulate these errors from these sources. Since there are numerous error sources, there will be numerous functions to simulate them. However, depending on the type of information, only a few will be appropriate for any given field.

Information about which dirtying functions should be applied to what fields, and how frequently, is determined by the dirtying model and the dirtying plan. Each dirtying function takes as input a record from the record collection.

Figure 11:
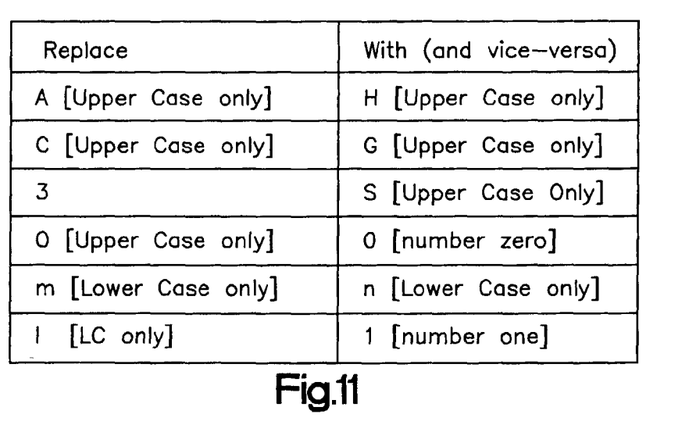
FIG. 11 is a schematic representation of an example function for use with an example system in accordance with the present invention.

FIG. 11 illustrates a simple example of a "Looks-Like Error" dirtying function. This function searches for characters in the left-hand column, and, if found, replaces them with their look-alikes in the right-hand column.

Figure 12:
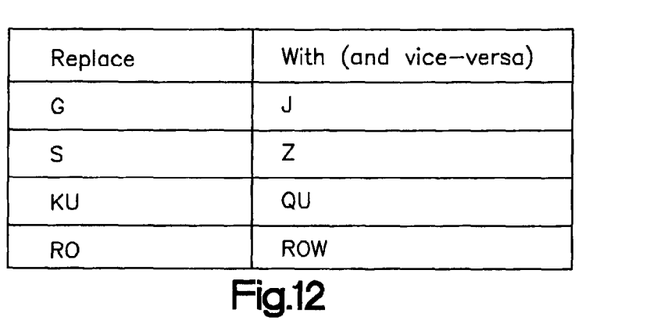
FIG. 12 is a schematic representation of another example function for use with an example system in accordance with the present invention.

FIG. 12 illustrates a simple example of a "Sounds-Like Error" dirtying function. This function searches for the characters or character sequences in the left-hand column, and, if found, replaces them with their phonetic equivalents in the right-hand column (independently of the case).

An example "Keyboard Aim" dirtying function picks one character at random and replaces it with a character whose keyboard locations is to the left or right, above, or below it on a QWERTY keyboard. For example, the character "g" could be replaced with one of "r", "t", "y", "f", "h", "v", or "b."

An example "Multiple Persons Differences" dirtying function, for a given record, searches the name field for "and" or "&" (i.e., the target). If one of these is found, this function replaces the record with two new records, one with the target and the word following deleted, and one with the target and the word preceding deleted.

If the target is not found, this function may pick another record at random and obtain the first and last name from that record. Then, following the first name in the original record, the sequence: "and {first name} {last name}" is inserted. The function may leave off the last name 50% of the time.

From the above description of the invention, those skilled in the art will perceive improvements, changes and modifications. Such improvements, changes and modifications within the skill of the art are intended to be covered by the appended claims.

Having described the invention, the following is claimed:

1. A system for evaluating a data cleansing application, said system comprising:
    a collection of records cleansed by the data cleansing application;
    a dirtying model having a set of assumptions governing how errors are introduced into the cleansed data set;
    a plurality of dirtying functions for operating upon said collection to introduce errors to said collection, said plurality of dirtying functions being defined by said dirtying model, said plurality of dirtying functions producing a collection of dirty records; and
    a record of the errors introduced to the cleansed collection.

2. The system as set forth in claim 1 wherein at least one of said plurality of dirtying functions is a looks-like function.

3. The system as set forth in claim 1 wherein at least one of said plurality of dirtying functions is a sounds-like function.

4. The system as set forth in claim 1 wherein at least one of said plurality of dirtying functions is a keyboard aim function.

5. The system as set forth in claim 1 wherein at least one of said plurality of dirtying functions is a multiple persons differences function.

6. A method for evaluating a data cleansing application, said method comprising the steps of:
    creating a dirty test data set from a cleansed data set;
    generating a dirtying model comprising a set of assumptions governing how errors are introduced into the cleansed data set during said creating step;
    cleaning the dirty test data set with the data cleansing application; and
    comparing the output of said cleaning step to the cleansed data set.

7. The method as set forth in claim 6 further including the step of generating a dirtying plan comprising a set of steps governing how errors are introduced into the cleansed data set during said creating step.

8. The method as set forth in claim 6 wherein said creating step includes the addition of duplicate records to the cleansed data set.

9. The method as set forth in claim 6 further including the step of utilizing dirtying functions in order to determine how to perform said creating step.

* * * * *